United States Patent [19]

Chandra et al.

[11] Patent Number: 4,472,563
[45] Date of Patent: Sep. 18, 1984

[54] HEAT CURABLE SILICONES HAVING IMPROVED ROOM TEMPERATURE STABILITY

[75] Inventors: Grish Chandra; Peter Y. K. Lo; Yolanda A. Peters, all of Midland, Mich.

[73] Assignee: Dow Corning Corporation, Midland, Mich.

[21] Appl. No.: 576,985

[22] Filed: Feb. 6, 1984

[51] Int. Cl.³ .............................................. C08G 77/06
[52] U.S. Cl. ...................................... 528/15; 528/31; 528/32; 525/478; 524/15; 524/16; 524/779; 524/783; 524/785; 524/861; 524/862
[58] Field of Search ........................... 528/15, 31, 32; 525/478

[56] References Cited

U.S. PATENT DOCUMENTS 4,340,709 7/1982 Jeram et al. ............................ 528/15
4,340,710 7/1982 Brown, Jr. .............................. 528/15

*Primary Examiner*—Melvyn I. Marquis
*Attorney, Agent, or Firm*—Andrew H. Ward

[57] ABSTRACT

Improved inhibitor systems are disclosed for the reaction of silicon hydride containing silicones with vinyl containing and/or hydroxyl containing silicones. The improved inhibitors are mixtures of conjugated eneynes and vinylcyclosiloxanes. Inhibition of cure at room temperature is combined with rapid cure at elevated temperature when the improved inhibitors are used.

48 Claims, No Drawings

HEAT CURABLE SILICONES HAVING IMPROVED ROOM TEMPERATURE STABILITY

BACKGROUND OF THE INVENTION

This invention relates to heat curable silicones having improved room temperature stability. More specifically, this invention deals with silicone compositions that are curable at elevated temperatures by the catalyzed reaction of silane, hereinafter also SiH, groups to silicon-bonded vinyl groups, hereinafter also SiVi, and/or silicon-bonded hydroxyl groups, hereinafter also SiOH.

The reaction of SiH groups with SiVi and/or SiOH groups is a well known reaction for crosslinking silicone resins, elastomers, and coatings.

While this reaction provides rapid cure at elevated temperatures, there is an unfortunate tendency for cure to proceed slowly at room temperature. This tendency limits the amount of time a composition can be stored before use, as well as the work life of a composition in an industrial process.

This problem has been dealt with in two general ways: separation of the reactants until just before use, and the use of inhibitors.

Separation of the reactants before use is generally accomplished by providing the heat curable composition in two parts. One of these parts contains the SiH containing component, while the other contains the SiVi and/or SiOH containing component, and the catalyst. These two parts are then mixed prior to use.

There are disadvantages to the use of such two part systems however. Among other disadvantages, expenses related to packaging, shipping, handling, and storage are increased.

In addition, in such applictions as release coatings, where very rapid cure is essential, high levels of reactive groups and catalyst are used. A release coating supplied in two parts must still maintain a reasonable stability, after the two parts are mixed, to be practical.

The use of inhibitors is another solution to the problem of lack of room temperature stability.

The patent literature, for example, discloses the following classes of compounds as inhibitors for the reaction of SiH groups with SiVi and/or SiOH groups:
vinyl amides
hydroperoxides
aminoalkyl silanes
various metal salts
sulfoxides
acrylonitrile derivatives
acetylene derivatives, such as
dialkylacetylene dicarboxylates and
ethynylically unsaturated isocyanurates,
phosphines,
phosphites,
nitrogen-containing hydrocarbons, such as pyridine,
dithiocarbamate derivatives, and the like.

U.S. Pat. No. 4,340,709, issued July 20, 1982, discloses the use of methylvinylcyclotetrasiloxane, triaklylcyanurates, alkyl maleates, and mixtures of the above three types of compounds as inhibitors.

Copending Application for Patent Ser. No. 478,433, filed Mar. 24, 1983 and entitled "Room Temperature Stable, Heat Activated Organopolysiloxane Compositions" discloses the use of conjugated ene-ynes as inhibitors of the reaction of SiH and SiVi.

Conjugated ene-ynes are hydrocarbons containing a triple bond, i.e. and "yne" bond, and a double bond, i.e. an "ene" bond in conjugation with one another.

U.S. Pat. No. 4,340,710, issued July 20, 1982, discloses the use of ethynylically unsaturated isocyanurates and dialkylacetylenecarboxylates conjointly as inhibitors.

The present invention deals with the use, as the inhibitor, of vinylcyclosiloxanes in combination with one or mor conjugated ene-yne. Suprisingly, the use of this combination results in room temperature inhibition of cure that is 5 or more times as effective as the room temperature inhibition of cure observed for comparable levels of either the ene-yne or the vinylcyclosiloxane independently. In addition, no significant reduction in the rate of cure at elevated temperature has been noted. In some cases, actual acceleration of the elevated temperature cure rate has been observed.

SUMMARY OF THE INVENTION

It is an object of this invention to provide a silicone composition that is curable at elevated temperature and has improved stability at room temperature. It is another object to provide silicone coating compositions that are curable at elevated temperature and have improved stability at room temperature. It is yet another object to provide silicone resins that are curable at elevated temperatures and have improved stability at room temperature. It is a further object to provide silicone elastomers that are curable at elevated temperatures and have improved stability at room temperature. It is another object to provide curable silicone compositions having extended work life. It is another object to provide improved inhibitors.

These objects and others are attained by the compositions of this invention, which compositions comprise, in combination:
(A) a silicone containing SiVi groups and/or SiOH groups;
(B) A silicone containing SiH groups;
(C) a catalyst;
(D) A conjugated ene-yne; and
(E) vinylcyclosiloxanes.

DETAILED DESCRIPTION OF THE INVENTION

This invention relates to a curable silicone composition comprising the combination of:
(A) a polyorganosiloxane having the general formula $R_3^2SiO(R^1_aQ_bSiO_{(4-a-b)/2})_xSiR_3^2$, wherein
  $R^1$ is a non-olefinic monovalent hydrocarbon or halogenated hydrocarbon radical;
  Q is a vinyl-containing radical of the general formula $(C_nH_{2n})CH=CH_2$, wherein n has a value of from 0 to 4;
  $R^2$ is selected from the group consisting of $R^1$ radicals, Q radicals, and hydroxyl radicals;
  x has a value of from 18 to 6000;
  a has a value of 0, 1 or 2;
  b has a value of 0, 2 or 2;
  the average sum of the values of a plus b is from 1.8 to 2.2;
  there is at least one radical per polyorganosiloxane selected from the group consisting of Q radicals and hydroxyl radicals;
(B) a polyorganosiloxane containing hydrogen atoms bonded to silicon atoms;
(C) a catalyst;

(D) a conjugated ene-yne, said conjugated ene-yne characterized by having:
(1) from 5 to 12 carbon atoms;
(2) a terminal ethynyl group;
(3) an ethenyl group in conjugation with said ethynyl group; and
(E) a vinylcyclosiloxane having the general formula $$(R^5CH_2=CHSiO)_m$$

wherein each $R^5$ is selected from methyl, ethyl, and phenyl groups, and m has an average value of from 3 to 6.

In other aspects, this invention deals with heat curable silicone coating compositions, with heat curable silicone elastomer compositions, and with heat curable silicone resin compositions, all of said compositions having enhanced room temperature stability, and to the products obtained by curing the above compositions.

Component (A) of the compositions of this invention is an SiVi or SiOH containing polyorganosiloxane having the general formula $$R_3{}^2SiO(R^1{}_aQ_bSiO_{(4-a-b)/2})_xSiR_3{}^2.$$

wherein $R^1$ is a non-olefinic monovalent hydrocarbon or halogenated hydrocarbon radical; Q is a vinyl-containing radical of the general formula $(C_nH_{2n})CH=CH_2$, wherein n has a value of from 0 to 4; $R^2$ is selected from the group consisting of $R^1$ radicals, Q radicals, and hydroxyl radicals; x has a value of from 18 to 6000; a has a value of 0, 1 or 2; b has a value of 0, 1 or 2; the average sum of the values of a plus b is from 1.8 to 2.2; there is at least one radical per polyorganosiloxane selected from the group consisting of Q radicals and hydroxyl radicals.

Those of skill in the art will recognize that side chains present in such polyorganosiloxanes are terminated by $R_3{}^2SiO_{1/2}$ groups, just as the main chain is.

By non-olefinic hydrocarbon radical it is meant herein that said radical is singly bonded to a silicon atom, that said radical contains only single bonds, and that said radical is composed of carbon and hydrogen atoms. By non-olefinic, monovalent, halogenated hydrocarbon it is meant herein a non-olefinic hydrocarabon radical as defined above in which some or all of the hydrogen atoms have been replaced with halogen atoms, such as fluorine, chlorine, or bromine.

Examples of suitable non-olefinic monovalent hydrocarbon and halogenated hydrocarbon radicals include alkyl radicals, such as methyl, ethyl, propyl, butyl, and the like; halogenated alkyl radicals such as chloropropyl, 3,3,3-trifluoropropyl and the like; cycloaliphatic radicals such as cyclobutyl, cyclopentyl, cyclohexyl, cycloheptyl and the like; aryl radicals such as phenyl, tolyl xylyl and the like; and aralkyl radicals such as 2-phenyloctyl, benzyl, 2-ethyltolyl and the like. More preferably, most or all of the non-olefinic monovalent hydrocarbon or halogenated hydrocarbon radicals discussed in this specification are selected from the group consisting of methyl, phenyl, and 3,3,3-trifluoropropyl radicals.

Most preferably, most or all of the non-olefinic monovalent hydrocarbon or halogenated monovalent hydrocarbon radicals are methyl radicals.

Polyorganosiloxanes as described above are well known. Many can be obtained commercially; others can be synthesized for more basic starting materials using well known synthetic techniques.

For example, hydrolysis and subsequent condensation of monomers described by the formula $R^1{}_aQ_bSiX_{4-a-b}$, wherein $R^1$, Q, a, and b are as hereinabove described, and X is a hydrolyzable radical, such as a halogen atom or an alkoxy radical, will result in polyorganosiloxanes suitable for use as component (A).

Specific examples of polyorganosiloxanes suitable for use as component (A) include:

HOMe$_2$SiO(MeViSiO)$_5$(Me$_2$SiO)$_{95}$SiMe$_2$OH;
Me$_3$SiO(MeViSiO)$_{20}$(Me$_2$SiO)$_{20}$SiMe$_3$;
Me$_2$ViSiO(MeViSiO)$_6$(Me$_2$SiO)$_{98}$SiMe$_2$Vi;
HOMe$_2$SiO(Me$_2$SiO)$_{4000}$SiMe$_2$OH;
a resin composed of Me$_2$ViSiO$_{1/2}$ units, Me$_3$SiO$_{1/2}$ units and SiO$_{4/2}$ units;
CF$_3$CH$_2$CH$_2$Me$_2$SiO(MeViSiO)$_{15}$(CF$_3$CH$_2$CH$_2$MeSiO)$_{85}$SiMe$_2$CH$_2$CH$_2$CF$_3$; and other polyorganosiloxanes having SiVi groups and/or SiOH group. The term Me is used herein to represent the methyl radical, and the term Vi to represent the vinyl radical.

Component (B) of the compositions of this invention is a polyorganosiloxane containing one or more hydrogen atoms, bonded to silicon atoms. Component (B) is described by the general unit formula:

$R^3{}_cH_dSiO_{(4-c-d)/2}$, wherein $R^3$ is a non-olefinic monovalent hydrocarbon or halogenated hydrocarbon radical as described for R' of component (A);

H is a hydrogen atom;

c has a value of 0, 1, 2 or 3; and d has a value of 0, 1, or 2; there being at least one unit wherein d has a value of 1.

Units of the above description are combined to form linear, branched, or cyclic polymers.

Preferably, c has a value of 0, 1 or 2, d has a value of 0 or 1, and the values of c and d are selected such that their sum is from 1.8 to 2.2.

A polyorganosiloxane of this description is substantially linear, and can be represented by the general formula $R_3{}^4SiO(R_c{}^3H_dSiO_{(4-c-d)/2})_ySiR_3{}^4$, wherein $R^4$ is selected from H radicals and $R^3$ radicals, and y has a value of from 18 to 6000. There must be at least one H atom present in said polyorganosiloxane on average.

Polyorganosiloxanes as described for component (B) are well known. Many are commercially available. The synthesis of such polyorganosiloxanes from more basic starting materials is also well known.

For example, hydrolysis and condensation of monomers described by the general formula $$R_c{}^3H_dSiX_{4-c-d},$$

wherein $R^3$, c, d, and X are all as hereinabove described, is a method for producing polyorganosiloxanes suitable for use as component (B).

Specific examples of polyorganosiloxanes suitable for use as component (B) include:
(MeHSiO)$_5$;
Me$_2$HSiO(MeHSiO)$_5$(Me$_2$SiO)$_{43}$SiMe$_2$H;
Me$_3$SiO(MeHSiO)$_{22}$(MeC$_6$H$_5$SiO)$_{28}$SiMe$_3$
Me$_3$SiO(MeHSiO)$_{35}$SiMe$_3$;
Me$_3$SiO(MeHSiO)$_{30}$(Me$_2$SiO)$_{970}$SiMe$_3$;
Me$_2$HSiO(Me$_2$SiO)$_{450}$SiMe$_2$H;
Me$_3$SiO(MeHSiO)$_{24}$(CF$_3$CH$_2$CH$_2$MeSiO)$_{74}$SiMe$_3$;
resins containing MeHSiO units, Me$_3$SiO$_{1/2}$ units and SiO$_{4/2}$ units; and other suitable polyorganosiloxanes containing SiH groups which will be familiar to those skilled in the art.

Component (C) of the compositon of this invention is the catalyst. The catalyst is selected from the salts, compounds and elemental forms of platinum, rhodium, palladium, ruthenium, rhenium, osmium, and iridium.

It is preferred that salts or compounds of the above metals that are soluble in a mixture of components (A), (B), (D) and (E) be selected.

It is further preferred that the catalyst be selected from the soluble salts and compounds of platinum and rhodium.

It is most preferred to use a platinum compound that is soluble in components (A), (B), (D) and (E).

A particularly preferred catalyst is the compound formed by heating chloroplatinic acid with an SiVi-containing polyorganosiloxane.

Catalysts as described above are well known.

Component (D) of the compositions of this invention is the conjugated ene-yne. The conjugated ene-yne is characterized by containing:

(1) from 5 to 12 carbon atoms;
(2) a terminal ethynyl group; and
(3) an ethenyl group in conjugation with said ethynyl group.

The term "conjugation" as used herein is to be construed as follows: two multiple bonds in a hydrocarbon may be said to be conjugated if they are separated by one, and only one, single bond.

Component (D) is a hydrocarbon, that is, component (D) is composed of hydrogen and carbon atoms. Examples of conjugated ene-ynes suitable for use as component (D) are the following:

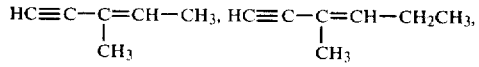

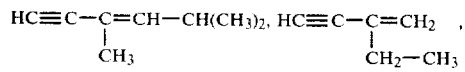

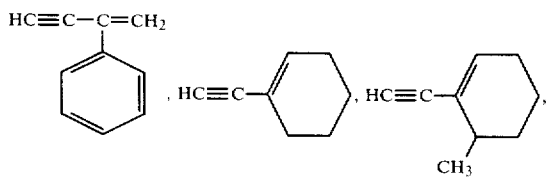

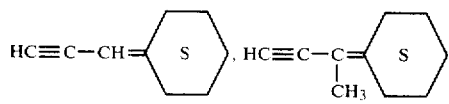

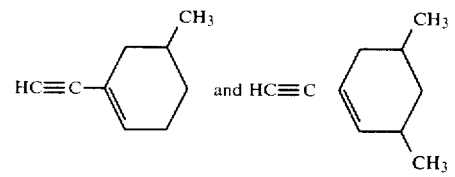

particularly preferred conjugated ene-ynes are

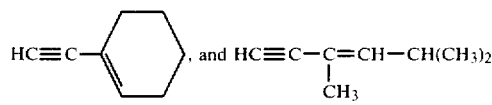

Conjugated ene-ynes suitable for use as component (D) can be synthesized from available starting materials by methods well known in organic chemistry. The patent literature also discusses methods for the synthesis of conjugated ene-ynes suitable for use as component (D) of the compositions of this invention.

For example, the appropriate ethynyl group terminated alcohol can be dehydrated in pyridine by $PCl_5$ to form the corresponding conjugated ene-yne. This is illustrated by the following exemplary equation:

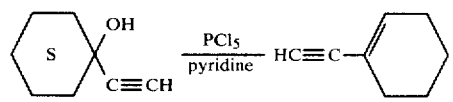

Other methods of synthesizing conjugated ene-ynes are known by those skilled in the art.

Component (E) of the compositions of this invention, is vinylcyclosiloxane. Vinylcyclosiloxane is represented by the general formula $(R^5ViSiO)_m$, wherein each m has an integer value of 3, 4, 5, 6, 7, 8, and higher integers. Each $R^5$ is selected from methyl, ethyl, and phenyl groups. Preferably $R^5$ is a methyl group. Vinylcyclosiloxanes are frequently furnished as mixtures in which m has an average value between 4 and 5. It is to be understood that this average value encompasses species wherein m is 3, 4, 5, 6, 7, 8, and higher integers. It is not known at this time whether the particular value, or average value, of m has any effect on the composition of this invention. It is also not known if the use of a mixture rather than a pure compound has any effect on the compositions of this invention. It is not believed that the inclusion of small amounts, such as 10 or 15 mole percent, of other diorganosiloxane units has any significant effect. Examples of possible contaminating diorganosiloxane units are $(Me_2SiO)$ units, $(MeC_6H_5SiO)$ units and the like.

Vinylcyclosiloxanes are well known intermediates in organosilicon chemistry. They are readily commercially available.

The relative amounts of components (A) thru (E) that are used in the composition of this invention are not narrowly critical, and can vary widely. The relative amounts of the components used depends largely upon the desired use of the composition.

All amounts set forth herein are expressed in parts by weight, based upon 100 total parts of component (A), (B), (D), and (E).

Broadly:
component (A) is present from 0.5 to 99.48 parts;
component (B) is present from 0.5 to 99.48 parts;
component (C) is present from 0.000001 to 1.0 parts;
component (D) is present from 0.01 to 10 parts; and
component (E) is present from 0.01 to 10 parts,
all of the above parts based upon 100 total parts of (A) plus (B) plus (D) plus (E).

More preferably:
component (A) is present from 92 to 98.5 parts;
component (B) is present from 1.4 to 10 parts;
component (C) is present from 0.004 to 0.50 parts;

component (D) is present from 0.05 to 5 parts;
component (E) is present from 0.05 to 5 parts;
all of the above parts based upon 100 total parts of (A) plus (B) plus (D) plus (E).

The compositions of this invention can contain other, optional ingredients. For example, the compositions of this invention can contain fillers, solvents, flame retardants, antimicrobial preparations, surfactants, oxidation inhibitors, dyes, pigments, perfumes, and the like.

Of course, any additives which are known, or are discovered, to poison the catalyst or otherwise render the compositions unusable, are to be avoided.

When accounting for the amounts of such other, optional ingredients, the amounts referred to herein are on the basis of 100 total parts of components (A), (B), (D), and (E) Thus, as an example, the addition of an equal amount of filler to a composition of this invention is expressed as 100 parts of filler added to 100 parts components (A), (B), (D) and (E) of this invention.

Examples of fillers useful in the compositions of this invention include reinforcing fillers and extending fillers. Examples of reinforcing fillers include: silica, such as fume silica and precipitated silica; and treated silica, such as fume or precipitated silica that has been reacted with e.g. an organohalosilane, a disiloxane, or a disilazane.

Examples of extending fillers include crushed quartz, aluminum oxide, aluminum silicate, zirconium silicate, magnesium oxide, zinc oxide, talc, diatomaceous earth, iron oxide, calcium carbonate, clay, titania, zirconia, mica, glass, such as ground glass or glass fiber, sand, carbon black, graphite, barium sulfate, zinc sulfate, wood flour, cork, fluorocarbon polymer powder, rice hulls, ground peanut shells, and the like.

Solvents suitable for use with the compositions of this invention include well known solvents for silicones having chemical compositions similar to those described for component (A) or component (B).

Examples of such solvents include aliphatic hydrocarbons, such as pentane, hexane, heptane, octane, nonane and the like; aromatic hydrocarbons such as benzene, toluene and xylene; alcohols such as methanol, ethanol, and butanol; ketones such as acetone, methyl-ethyl ketone and methyl-isobutyl ketone; and halogenated solvents such as fluorine-, chlorine-, and bromine-substituted aliphatic or aromatic hydrocarbons, such as trichloroethane, perchloroethylene, bromobenzene and the like. Two or more solvents may be used together.

The compositions of this invention are made by mixing together the desired quantities of component (A), (B), (C), (D), (E), and any optional ingredients in suitable mixing equipment.

Suitable mixing equipment is very well known and widely available. Selection of a specific type of mixing equipment will be guided by the viscosity of the mixture of components (A), (B), (C), (D), and (E).

For example, if the viscosity of the mixture is expected to be low, such as 10 to 500 centistokes, mechanical stirrers such as paddle stirrers can be used to produce a mixture of components (A) and (B). If a viscosity from 500 centipoise to 100,000 centistokes is expected, such equipment as three roll mills, sigmoid blade mixers, bread dough mixers and the like can also be used. If a viscosity in excess of 100,000 centipoise is expected, such equipment as two roll mills, or Baker Perkins mixers may be required.

The compositions of this invention are cured by exposure to elevated temperature. The specific times and temperatures that are to be used can vary widely, depending upon the specific use intended for the cured composition, the relative amounts of SiH, SiVi, and SiOH groups present, the amounts of catalyst, amounts of inhibitor, and other factors.

For example, a composition having a high amount of SiH, SiVi and catalyst can be cured in a few seconds at 70° C. As another example, a composition having low amounts of SiH, SiOH and catalyst may require 3 or 4 hours at 120° C. or so.

Three specific embodiments of the compositions of this invention are particularly contemplated: first, a heat curable silicone resin composition, second a heat curable silicone coating composition, and third a heat curable elastomer composition.

The curable silicone resin composition comprises the combination of:

(A) a polyorganosiloxane having the general formula $$R_3{}^2SiO(R^1{}_aQ_bSiO_{(4-a-b)/2})_xSiR_3{}^2,$$

wherein
$R^1$ is a non-olefinic monovalent hydrocarbon or halogenated hydrocarbon radical;
Q is a vinyl-containing radical of the general formula $(H_{2n})CH=CH_2$, wherein n has a value of from 0 to 4;
$R^2$ is selected from the group consisting of $R^1$ radicals; Q radicals, and hydroxyl radicals;
x has a value of from 18 to 6000;
a has a value of 0, 1 or 2;
b has a value of 0, 1 or 2;
the average sum of the values of a plus b is from 1.8 to 2.2;
there is at least one radical per polyorganosiloxane selected from the group consisting of Q radicals and hydroxyl radicals;
(B) a polyorganosiloxane containing hydrogen atoms bonded to silicon atoms;
(C) a catalyst;
(D) a conjugated ene-yne, said conjugated ene-yne characterized by having;
  (1) from 5 to 12 carbon atoms;
  (2) a terminal ethynyl group;
  (3) an ethenyl group in conjugation with said ethynyl group;
(E) A vinylcyclosiloxane having the general formula $$(R^5CH_2=CHSiO)_m$$

wherein each $R^5$ is selected from methyl, ethyl, and phenyl groups, and m has an average value of from 3 to 6; and
(F) a filler.

The curable resin composition of this invention is useful in encapsulating components, such as electronic components; it is useful as a potting compound for electronic circuitry; and it is useful for other well known applications of curable silicone resins.

The curable resin can be fabricated in various well known processes, such as press molding, transfer molding, extrusion, potting, or other processes.

The second specific embodiment of the composition of the present invention is a curable coating composition for substrates, said coating composition comprising:

(A) from 0.5 to 99.48 parts of a polyorganosiloxane having the formula $$R_3{}^2SiO(R^1{}_aQ_bSiO_{(4-a-b)/2})_xSiR_3{}^2,$$

wherein $R^1$ is a non-olefinic monovalent hydrocarbon or halogenated hydrocarbon radical;

Q is a vinyl-containing radical;

$R^2$ is selected from the group consisting of Q radicals, $R^1$ radicals, and OH radicals;

a has a value of 0, 1 or 2;

b has a value of 0, 1, or 2;

the average sum of the values of a plus b is from 1.8 to 2.2; and

X has a value of from 18 to 4000, there being at least one vinyl or OH group per molecule;

(B) from 0.5 to 99.48 parts of a polyorganosiloxane having the formula $$R_3{}^4SiO(R^3{}_cH_dSiO_{(4-c-d)/2})_ySiR_3{}^4,$$

wherein $R^3$ is a non-olefinic monovalent hydrocarbon or halogenated hydrocarbon radical;

H is a hydrogen atom;

$R^4$ is selected from the group consisting of H atoms, and $R^3$ radicals;

c has a value of 0, 1 or 2;

d has a value of 0, 1, or 2;

the average sum of the values of c plus d is from 1.8 to 2.2; and y has a value of from 18 to 500, there being at least one H atom bonded to silicon present per molecule;

(C) from 0.000001 to 1.0 parts, based on the weight of metal, of a catalyst;

(D) from 0.1 to 10 parts of an inhibitor, said inhibitor being a hydrocarbon containing:
 (1) from 5 to 12 carbon atoms;
 (2) a terminal ethynyl group;
 (3) an ethenyl group in conjugation with said ethynyl group;

(E) from 0.01 to 10 parts of a vinylcyclosiloxane having the general formula $$(R^5CH_2=CHSiO)_m$$

wherein each $R^5$ is selected from methyl, ethyl, and phenyl groups, and m has an average value of from 3 to 6; and (G) from 0 to 4000 parts of a solvent, all of the above parts being parts by weight based on 100 total parts of Components (A) plus (B) plus (D) plus (E).

While the coating composition of the present invention can be furnished and used either with a solvent or without a solvent, it is preferred to furnish and use said composition without a solvent. Use without a solvent is facilitated by selecting components (A) and (B) that are relatively low in viscosity, e.g. 100 to 5000 centistokes.

The coating compositions of the present invention can be applied to a variety of substrates. Examples of such substrates include: natural products, such as wood and stone; paper products, such as paper, cardboard and the like; plastics, such as polyethylene, polypropylene, and polymethylpentene, polyethylene terephthalate, polybutylene terephthalate and the like; metals, such as aluminum, copper, zinc, magnesium, iron, steel, nickel, chromium and the like; and other substrates.

Application of the coating composition to the substrate can be accomplished by an appropriate coating technique. Examples of coating techniques useful with the coating composition of this invention include spray coating, direct gravure coating, offset gravure coating, Mayer rod coating, two-roll coating, kiss coating, air knife coating and other known coating techniques.

The coating compositions of this invention can be used to fabricate release paper of excellent quality.

The third specific embodiment of the composition of the present invention is a curable silicone elastomer composition, said composition comprising:

(A) from 0.5 to 99.48 parts of a polyorganosiloxane having the formula $$R_3{}^2SiO(R^1{}_aQ_bSiO_{(4-a-b)/2})_xSiR_3{}^2,$$

wherein $R^1$ is a non-olefinic monovalent hydrocarbon or halogenated hydrocarbon radical;

Q is a vinyl-containing radical;

$R^2$ is selected from the group consisting of Q radicals, $R^1$ radicals, and OH radicals;

a has a value of 0, 1 or 2;

b has a value of 0, 1, or 2;

the average sum of the values of a plus b is from 1.8 to 2.2; and x has a value of from 50 to 6000, there being at least one vinyl or OH group per molecule;

(B) from 0.5 to 99.48 parts of a polyorganosiloxane having the formula $$R_3{}^4SiO(R^3{}_cH_dSiO_{(4-c-d)/2})_ySiR_3{}^4,$$

wherein $R^3$ is a non-olefinic monovalent hydrocarbon or halogenated hydrocarbon radical;

H is a hydrogen atom;

$R^4$ is selected from the group consisting of H atoms, and $R^3$ radicals;

c has a value of 0, 1 or 2;

d has a value of 0, 1, or 2;

the average sum of the values of c plus d is from 1.8 to 2.2; and y has a value of from 50 to 6000, there being at least one H atom bonded to silicon present per molecule;

(C) from 0.000001 to 1.0 parts, based on the weight of metal, of a catalyst;

(D) from 0.01 to 10 parts of an inhibitor, said inhibitor being a hydrocarbon containing;
 (1) from 5 to 12 carbon atoms;
 (2) a terminal ethynyl group; and
 (3) an ethenyl group in conjugation with said ethynyl group;

(E) from 0.01 to 10 parts of a vinylcyclosiloxane having the general formula $$(R^5CH_2=CHSiO)_m$$

wherein each $R^5$ is selected from methyl, ethyl, and phenyl groups, and m has an average value of from 3 to 6; and (F) from 0 to 400 parts of a filler, all of the above parts being parts by weight based on 100 total parts of Components (A) plus (B) plus (D) plus (E).

The curable silicone elastomer composition can be fabricated by any of the conventional silicone elastomer fabrication techniques, such as compression molding, injection molding, extrusion, and other well known silicone rubber fabrication techniques.

The following Examples are presented to further illustrate making and using the compositions of this invention. These Examples are not to be construed as placing limits on the scope of this invention. In the Examples, all parts and percentages noted are by weight unless otherwise specified. Me in the Examples denotes a methyl radical and Vi denotes a vinyl radical.

The vinylcyclosiloxanes used in the following examples were methylvinylcyclosiloxanes represented by the formula $(MeViSiO)_m$. The relative amounts of different cyclic species in the particular methylvinylcyclosiloxanes used in the examples are set forth in Table 1.

TABLE 1

| Distribution of Methylvinylcycosiloxane Species | |
|---|---|
| m | Percentage by Weight |
| 3 | 12.6% |
| 4 | 73.3% |
| 5 | 10.0% |
| >5 | 4.1% |

Test Procedures

The following test procedures were used to evaluate cured films in the following examples.

Smear-Smear of a coating was evaluated by lightly rubbing the cured coating with a finger. A wholly cured coating will not change in appearance upon rubbing. No change in appearance in the smear test is recorded in the following examples as "none".

Rub-off-Rub-off of a coating was evaluated by vigorously rubbing the cured coating with a finger. The result "none" indicates that the coating could not be removed in this manner. The result "ruboff" indicates that the coating was easily removed.

Migration-Migration was evaluated herein by: first, adhering a strip of standard adhesive-coated tape to the cured coating by firmly pressing the side coated with adhesive to the cured coating; second, removing the tape from the cured coating by peeling the tape up; third, doubling the removed tape back upon itself with the adhesive-coated side adhering to itself; and fourth, comparing the force required to peel the doubled tape to the force required to peel a freshly prepared, similarly doubled tape which had never been adhered to the coating. If the force required is substantially the same, no migration of the coating or components thereof has occurred. This result is recorded as "none" with respect to migration. Total loss of adherence indicates that migration of coating components has taken place. This result is recorded as "migration".

EXAMPLE 1

In this example, the following components were mixed together:

Component (A): 97.7 parts of a polymer having the approximate average formula $Me_2ViSiO(Me_2SiO)_{3400}(MeViSiO)_{70}SiMe_2Vi$ Component (B): 1.6 parts of a polyorganohydrogensiloxane having the average formula:

$Me_3SiO(MeHSiO)_{35}SiMe_3$

Component (C): 0.008 parts, based on the weight of platinum, of the reaction product of chloroplatinic acid and $(Me_2ViSi)_2O$ Component (D): 0.52 parts of

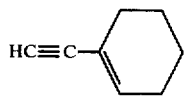

Component (E) 0.16 parts of methylvinylcyclosiloxane

Component (G) 215 parts of toluene and 1227 parts of heptane

The resulting coating composition of this invention was coated onto 40 pound supercalendered Kraft paper by means of a No. 12 Mayer rod. The coated paper was then cured in a forced air oven set at 170° F. until the coating showed no smear, or migration, and no rub-off.

The coating and curing procedure above was repeated periodically to determine any changes in cure time as the coating composition aged. The following results were noted:
initial cure time: 35 seconds
after 1 hour aging: 45 seconds
after 5 hour aging: 90 seconds The above example was repeated with a composition identical to Example 1 but with no methylvinylcyclosiloxanes added. The following results were noted:
initial cure time: 150 seconds
after 1 hour aging: 240 seconds

EXAMPLE 2

The procedure of Example 1 was duplicated for the following composition:
(A) 97.9 parts of component (A) of Example 1;
(B) 1.63 parts of component (B) of Example 1;
(C) 0.078 parts of the catalyst of Example 1;
(D) 0.359 parts of

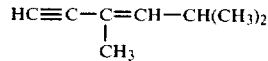

(E) 0.097 parts of methylvinylcyclosiloxanes.

The following results were noted in evaluating minimum cure time as a function of aging:
initial cure time: 45 seconds
after 1 hour aging: 75 seconds
after 2 hours aging: 90 seconds
after 3 hours aging: 90 seconds
after 5 hours aging: 195 seconds As a comparison, Example 2 was repeated without the methylvinylsiloxane. The following results were noted:
initial cure time: 180 seconds
after 1 hour aging: 300 seconds As another comparison, Example 2 was repeated without the conjugated ene-yne. The following results were noted.
initial cure time: 180 minutes
after 2 hours aging: 300 minutes

EXAMPLE 3

In this example, the following components were mixed together:

(A) 95.0 parts of a polyorganosiloxane having approximately 1.8 mole percent MeViSiO units, 98.2 mole percent Me$_2$SiO units, and having a viscosity of about 300 centipoise;
(B) 3.87 parts of component (B) of Example 1;
(C) 0.009 parts, by weight of rhodium, as a soluble rhodium compound;
(D) 0.116 parts of

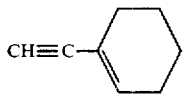

(E) 1.014 parts of methylvinylcyclosiloxane.

When applied to paper, the above coating composition showed no smear, no migration, and no ruboff after being cured for 20 seconds at 300° F.

The viscosity of this coating composition was monitored as a function of time. The viscosity was found to have doubled in 48 hours.

In a parallel experiment in which the methylvinylcyclosiloxane was not included, the viscosity was found to have doubled in only 30 hours.

EXAMPLE 4

The following components were mixed together:
(A) 95.91 parts of a polyorganosiloxane having the average formula HOMe$_2$SiO(Me$_2$SiO)$_{2400}$H;

(B) 1.62 parts of component (B) from Example 1;
(C) 0.0044 parts of the platinum catalyst of Example 1;
(D) 2.7 parts of

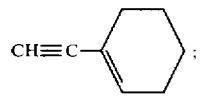

(E) 0.934 parts of methylvinylcyclosiloxane;
(F) 109 parts heptane; and 10 parts of toluene.

The viscosity of this solution was monitored as a function of time aged at room temperature; the viscosity showed no change after 144 hours.

In a parallel experiment, all the above components except the methylvinylcyclosiloxane were mixed together. The viscosity was found to increase from 60 centistokes to 75 centistokes in 72 hours, and to 77.5 centistokes after 144 hours.

Comparison Experiment

In this experiment, the following components were mixed together. This comparison is not an embodiment of the present invention because it contains no component (A).

3.24 parts methylvinylcyclosiloxane;
95.38 parts of a polymer having the formula Me$_3$SiO(Me$_2$SiO)$_{700}$SiMe$_3$;

1.31 parts of component (B) of Example 1;
0.0073 parts of the platinum catalyst of Example 1; and
0.0655 parts of

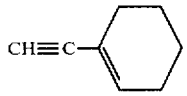

The resulting mixture was dissolved in a mixture of heptane and toluene, such that the above components constituted approximately 1%.

The above coating composition was coated on paper following the procedure of Example 1. After 5 minutes exposure to 300° F., smearing of the coating was observed.

EXAMPLE 5

The following elastomer composition of the present invention was formulated:
(A) 98.33 parts of a polymer having the average formula Me$_2$ViSiO(Me$_2$SiO)$_{190}$SiMe$_2$Vi (B) 1.54 parts of a polymer consisting of
46% (MeHSiO) units and
54% (Me$_2$SiO) units and Me$_3$SiO$_{\frac{1}{2}}$ units
(C) 0.077 parts of the platinum catalyst of Example 1
(D) 0.064 parts of

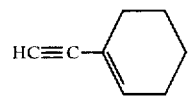

(E) 0.064 parts of methylvinylcyclosiloxanes
(F) 94 parts of trimethylsilylated silica After being thoroughly mixed, the above composition was placed in an air circulating oven set at 55° C. After 15 hours the composition gelled.

In a parallel experiment, a similar composition with no methylvinylcyclosiloxane was found to gel in 6 hours at 55° C. In another parallel experiment with neither the conjugated ene-yne nor the methylvinylcyclosiloxanes present, the composition was found to gel in less than 2 minutes.

That which is claimed is:

1. A curable silicone composition comprising the combination of:

(A) a polyorganosiloxane having the general formula

R$_3^2$SiO(R$^1_a$Q$_b$SiO$_{(4-a-b)/2}$)$_x$SiR$_3^2$, wherein
R$^1$ is a non-olefinic monovalent hydrocarbon or halogenated hydrocarcon radical;
Q is a vinyl-containing radical of the general formula (C$_n$H$_{2n}$)CH=CH$_2$, wherein n has a value of from 0 to 4;
R$^2$ is selected from the group consisting of R$^1$ radicals, Q radicals, and hydroxyl radicals;
x has a value of from 18 to 6000;
a has a value of 0, 1 or 2;
b has a value of 0, 1 or 2;
the average sum of the values of a plus b is from 1.8 to 2.2;
there is at least one radical per polyorganosiloxane selected from the group consisting of Q radicals and hydroxyl radicals;

(B) a polyorganosiloxane containing hydrogen atoms bonded to silicon atoms;
(C) a catalyst;
(D) a conjugated ene-yne, said conjugated ene-yne characterized by having:
  (1) from 5 to 12 carbon atoms;
  (2) a terminal ethynyl group;
  (3) an ethenyl group in conjugation with said ethynyl group; and
(E) a vinylcyclosiloxane having the general formula $$(R^5CH_2\!=\!CHSiO)_m$$

wherein each $R^5$ is selected from methyl, ethyl, and phenyl groups, and m has an average value of from 3 to 6.

2. A curable composition as claimed in claim 1 wherein $R^5$ is a methyl radical.

3. A curable silicon composition as claimed in claim 2 wherein component (B) has the general formula $$R_3^4SiO(R_c^3H_dSiO_{(4-c-d)/2})_ySiR_3^4,$$

wherein in said formula:
$R^3$ is a non-olefinic monovalent hydrocarbon or halogenated hydrocarbon radical;
H is a hydrogen atom;
$R^4$ is selected from the group consisting of H radicals and $R^3$ radicals
y has a value of from 18 to 6000;
c has a value of 0, 1 or 2;
d has a value of 0, 1 or 2;
and the sum of the values of c plus d is from 1.8 to 2.2, there being at least two units wherein d has a value of 1.

4. A curable silicone composition as claimed in claim 3 wherein
component (A) is present from 0.5 to 99.48 parts;
component (B) is present from 0.5 to 99.48 parts;
component (C) is present from 0.000001 to 1.0 parts;
component (D) is present from 0.01 to 10 parts; and
component (E) is present from 0.01 to 10 parts;
there being 100 total parts of components (A) plus (B) plus (D) plus (E), all parts being by weight.

5. A curable silicone composition as claimed in claim 4 wherein
component (A) is present from 92 to 98.5 parts;
component (B) is present from 1.4 to 10 parts;
component (C) is present from 0.004 to 0.50 parts;
component (D) is present from 0.05 to 5 parts; and
component (E) is present from 0.05 to 5 parts;
there being 100 total parts of components (A) plus (B) plus (D) plus (E), all parts being by weight.

6. A curable silicone composition as claimed in claim 5 wherein component (C) is a compound of platinum.

7. A curable silicone composition as claimed in claim 6 wherein component (D) is

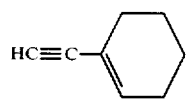

8. A curable silicone composition as claimed in claim 6 wherein component (D) is

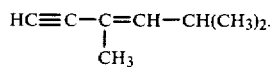

9. A curable composition as claimed in claim 5 wherein component (C) is a compound of rhodium.

10. A curable composition as claimed in claim 9 wherein component (D) is

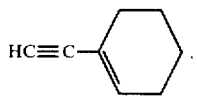

11. A curable composition as claimed in claim 9 wherein component (D) is

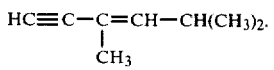

12. A curable resin composition as claimed in claim 1, said composition further comprising:
(F) a filler.

13. A curable composition as claimed in claim 12 wherein
component (A) is present from 0.5 to 99.48 parts;
component (B) is present from 0.5 to 99.48 parts;
component (C) is present from 0.000001 to 1.0 parts;
component (D) is present from 0.01 to 10 parts; and
component (E) is present from 0.01 to 10 parts; there being 100 total parts of components (A) plus (B) plus (D) plus (E); and component (F) is present from 0 to 400 parts, all parts being parts by weight.

14. A curable silicone composition as claimed in claim 13 wherein
component (A) is present from 92 to 98.5 parts;
component (B) is present from 1.4 to 10 parts;
component (C) is present from 0.004 to 0.50 parts;
component (D) is present from 0.05 to 5 parts;
component (E) is present from 0.05 to 5 parts;
Component (F) is present from 0 to 250 parts, all parts being parts by weight based on 100 total parts of component (A) plus (B) plus (D) plus (E).

15. A curable silicone composition as claimed in claim 14 wherein component (C) is a compound of platinum.

16. A curable silicone composition as claimed in claim 15 wherein component D is

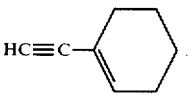

17. A curable silicone composition as claimed in claim 15 wherein component D is

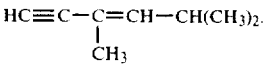

18. A curable silicone elastomer composition, said composition comprising:

(A) from 0.5 to 99.48 parts of a polyorganosiloxane having the formula

wherein
R$^1$ is a non-olefinic monovalent hydrocarbon or halogenated hydrocarbon radical;
Q is a vinyl-containing radical;
R$^2$ is selected from the group consisting of Q radicals, R$^1$ radicals, and OH radicals,
a has a value of 0, 1 or 2;
b has a value of 0, 1, or 2;
the average sum of the values of a plus b is from 1.8 to 2.2; and
x has a value of from 50 to 6000, there being at least one vinyl or OH groups per molecule;
(B) from 0.5 to 99.48 parts of a polyorganosiloxane having the formula

wherein
R$^3$ is a non-olefinic monovalent hydrocarbon or halogenated hydrocarbon radical;
H is a hydrogen atom;
R$^4$ is selected from the group consisting of H atoms, and R$^3$ radicals;
c has a value of 0, 1 or 2;
d has a value of 0, 1 or 2; the average sum of the values of c plus d is from 1.8 to 2.2; and
y has a value of from 50 to 6000, there being at least one H atom bonded to silicon present per molecule;
(C) from 0.000001 to 1.0 parts, based on the weight of metal, of a catalyst;
(D) from 0.01 to 10 parts of an inhibitor, said inhibitor being a hydrocarbon containing:
  (1) from 5 to 12 carbon atoms;
  (2) a terminal ethynyl group;
  (3) an ethenyl group in conjunction with said ethynyl group;
(E) from 0.01 to 10 parts of a vinylcyclosiloxane having the general formula

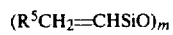

wherein each R$^5$ is selected from methyl, ethyl, and phenyl groups, and m has an average value of from 3 to 6; and
(F) from 0 to 400 parts of a filler, all of the above parts being parts by weight based on 100 total parts of components (A) plus (B) plus (D) plus (E).

19. A curable elastomer composition as claimed in claim 18 wherein R$^5$ is a methyl radical.

20. A curable elastomer composition as claimed in claim 19 wherein component (F) is present from 50 to 250 parts.

21. A curable elastomer composition as claimed in claim 20 wherein
component (A) is present from 92 to 98.5 parts;
component (B) is present from 1.4 to 10 parts;
component (C) is present from 0.004 to 0.50 parts;
component (D) is present from 0.05 to 5 parts; and
component (E) is present from 0.05 to 5 parts; and
component (F) is present from 50 to 150 all parts being parts by weight based on 100 total parts of component (A) plus (B) plus (D) plus (E).

22. A curable elastomer composition as claimed in claim 21 wherein component (C) is a compound of platinum.

23. A curable elastomer composition as claimed in claim 22 wherein component (D) is

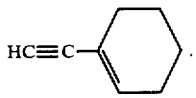

24. A curable elastomer composition as claimed in claim 22 wherein component (D) is

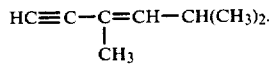

25. A curable coating composition for substrates, said coating composition comprising:
(A) from 0.5 to 99.48 parts of a polyorganosiloxane having the formula

wherein
R$^1$ is a non-olefinic monovalent hydrocarbon or halogenated hydrocarbon radical;
Q is a vinyl-containing radical;
R$^2$ is selected from the group consisting of Q radicals, R$^1$ radicals, and OH radicals;
a has a value of 0, 1 or 2;
b has a value of 0, 1, or 2;
the average sum of the values of a plus b is from 1.8 to 2.2; and
x has a value of from 18 to 4000, there being at least one vinyl or OH group per molecule;
(B) from 0.5 to 99.48 parts of a polyorganosiloxane having the formula

wherein
R$^3$ is a non-olefinic monovalent hydrocarbon or halogenated hydrocarbon radical;
H is a hydrogen atom;
R$^4$ is selected from the group consisting of H atoms, and R$^3$ radicals;
c has a value of 0, 1 or 2;
d has a value of 0, 1, or 2;
the average sum of the values of c plus d is from 1.8 to 2.2; and
y has a value of from 18 to 500, there being at least one H atom bonded to silicon present per molecule;
(C) from 0.000001 to 1.0 parts, based on the weight of metal, of a catalyst;
(D) from 0.1 to 10 parts of an inhibitor, said inhibitor being a hydrocarbon containing:
  (1) from 5 to 12 carbon atoms;
  (2) a terminal ethynyl group;
  (3) an ethenyl group in conjugation with said ethynyl group;
(E) from 0.01 to 10 parts of a vinylcyclosiloxane having the general formula

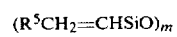

wherein each $R^5$ is selected from methyl, ethyl, and phenyl groups, and m has an average value of from 3 to 6. and (G) from 0 to 4000 parts of a solvent, all of the above parts being parts by weight based on 100 total parts of Components (A) plus (B) plus (D) plus (E).

26. A curable coating composition as claimed in claim 25 wherein $R^5$ is a methyl radical.

27. A curable coating composition as claimed in claim 26 wherein component (G) is present from 0 to 2000 parts.

28. A curable coating composition as claimed in claim 27 wherein
component (A) is present from 92 to 98.5 parts;
component (B) is present from 1.4 to 10 parts;
component (C) is present from 0.004 to 0.50 parts;
component (D) is present from 0.05 to 5 parts;
component (E) is present from 0.05 to 5 parts; and
component (G) is present from 200 to 800 parts, all parts being parts by weight based on 100 total parts of component (A) plus (B) plus (D) plus (E).

29. A curable coating composition as claimed in claim 28 wherein component (C) is a compound of platinum.

30. A curable coating composition as claimed in claim 29 wherein component (D) is

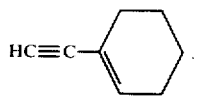

31. A curable coating composition as claimed in claim 29 wherein component (D) is

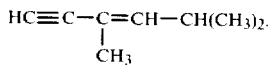

32. A curable coating composition as claimed in claim 25 wherein component A has the general formula $$HOMe_2SiO(Me_2SiO)_xSiMe_2OH,$$

wherein Me denotes the methyl radical.

33. A catalyst inhibitor consisting essentially of from 1 to 99 parts by weight of a conjugated ene-yne, said conjugated ene-yne characterized by having
(1) from 5 to 12 carbon atoms;
(2) a terminal ethynyl group;
(3) an ethenyl group in conjugation with said ethynyl group; and
from 1 to 99 parts by weight of a vinylcyclosiloxane having the general formula $$(R^5CH_2=CHSiO)_m,$$

wherein each $R^5$ is selected from methyl, ethyl, and phenyl groups, and m has an average value of from 3 to 6, there being 100 total parts.

34. In a curable silicone composition comprising a vinyl-containing or hydroxyl containing polyorganosiloxane, a polyorganohydrogensiloxane containing hydrogen atoms bonded to silicon atoms, a catalyst, and a catalyst inhibitor, the improvement comprising the use of, as the catalyst inhibitor, a composition consisting essentially of from 1 to 99 parts by weight of a conjugated ene-yne, said conjugated ene-yne characterized by having
(1) from 5 to 12 carbon atoms;
(2) a terminal ethynyl group;
(3) an ethnyl group in conjugation with said ethynyl group; and
from 1 to 99 parts by weight of a vinylcyclosiloxane having the general formula $$(R^5CH_2=CHSiO)_m,$$

wherein each $R^5$ is selected from methyl, ethyl, and phenyl groups, and m has an average value of from 3 to 6, there being 100 total parts.

35. The cured product of claim 1.
36. The cured product of claim 3.
37. The cured product of claim 7.
38. The cured product of claim 8.
39. The cured product of claim 9.
40. The cured product of claim 13.
41. The cured product of claim 14.
42. The cured product of claim 15.
43. The cured product of claim 20.
44. The cured product of claim 21.
45. The cured product of claim 22.
46. The cured product of claim 27.
47. The cured product of claim 28.
48. The cured product of claim 32.

* * * * *

UNITED STATES PATENT AND TRADEMARK OFFICE
CERTIFICATE OF CORRECTION

PATENT NO. : 4,472,563

DATED : September 18, 1984

INVENTOR(S) : Chandra, et. al.

It is certified that error appears in the above-identified patent and that said Letters Patent is hereby corrected as shown below:

In column 2, line 10, "mor" should read -- more --.

In column 2, line 60, "0, 2, or 2;" should read -- 0, 1, or 2; --

In column 3, lines 45-46, "hydrocarabon" should read -- hydrocarbon --.

In column 14, line 55 "hydrocarcon" should read -- hydrocarbon --

Signed and Sealed this

Fourth Day of June 1985

[SEAL]

*Attest:*

DONALD J. QUIGG

*Attesting Officer*   *Acting Commissioner of Patents and Trademarks*